US010146338B2

(12) United States Patent
Kämpf

(10) Patent No.: US 10,146,338 B2
(45) Date of Patent: Dec. 4, 2018

(54) ELECTRONIC PEN IMPLEMENTING SENSOR DRIFT COMPENSATION

(71) Applicant: STABILO International GmbH, Heroldsberg (DE)

(72) Inventor: Karl-Peter Kämpf, Röttenbach (DE)

(73) Assignee: STABILO INTERNATIONAL GMBH, Heroldsberg (DE)

( * ) Notice: Subject to any disclaimer, the term of this patent is extended or adjusted under 35 U.S.C. 154(b) by 0 days.

(21) Appl. No.: 15/311,400

(22) PCT Filed: May 15, 2015

(86) PCT No.: PCT/EP2015/060785
§ 371 (c)(1),
(2) Date: Nov. 15, 2016

(87) PCT Pub. No.: WO2015/173408
PCT Pub. Date: Nov. 19, 2015

(65) Prior Publication Data
US 2017/0115756 A1 Apr. 27, 2017

(30) Foreign Application Priority Data

May 15, 2014 (DE) .................. 10 2014 106 839

(51) Int. Cl.
G06F 3/0354 (2013.01)
G06F 3/038 (2013.01)
(52) U.S. Cl.
CPC .......... G06F 3/03545 (2013.01); G06F 3/038 (2013.01); G06F 3/0383 (2013.01)
(58) Field of Classification Search
None
See application file for complete search history.

(56) References Cited

U.S. PATENT DOCUMENTS 5,902,968 A   5/1999 Sato et al.
6,456,749 B1  9/2002 Kasabach et al.
(Continued)

FOREIGN PATENT DOCUMENTS

CN   101872259 A   10/2010
EP     1489381 A2   12/2004
(Continued)

OTHER PUBLICATIONS

Yang et al, Analysis and Compensation of Errors in the Input Device Based on Inertial Sensors, Conference: Proceedings of the International Conference on Information Technology: Coding and Computing (ITCC'04) vol. 2, Computer Society, Apr. 2004.

Primary Examiner — Kenneth B Lee, Jr.
(74) Attorney, Agent, or Firm — Angela Holt; Bradley Arant Boult Cummings LLP

(57) ABSTRACT

The invention concerns a method to detect and evaluate movement patterns and pen positions of an electronic pen with inertial measurement sensors during writing on a two-dimensional writing substrate, comprising: •an initial specification of two axes X, Y, that are orthogonal to each other on the writing substrate, and an axis Z that is perpendicular to the two-dimensional writing substrate, •whereby the X-axis defines the predominant writing direction, as well as a compensation of undesired drift in the pen position signal of the electronic pen to be output, comprising: •a moving average process during a predefined time interval and a predetermined frequency of the pen movements on the writing substrate, determined by the inertial measurement sensors during writing through integration of the sensor data of the measurement sensors, along the two said axes X, Y, that are orthogonal to each other, and a •periodic comparison of currently determined moving average values with initial average values and/or with previously determined moving average values, as well as the •subtraction of deviations, (Continued)

Figure 1A:
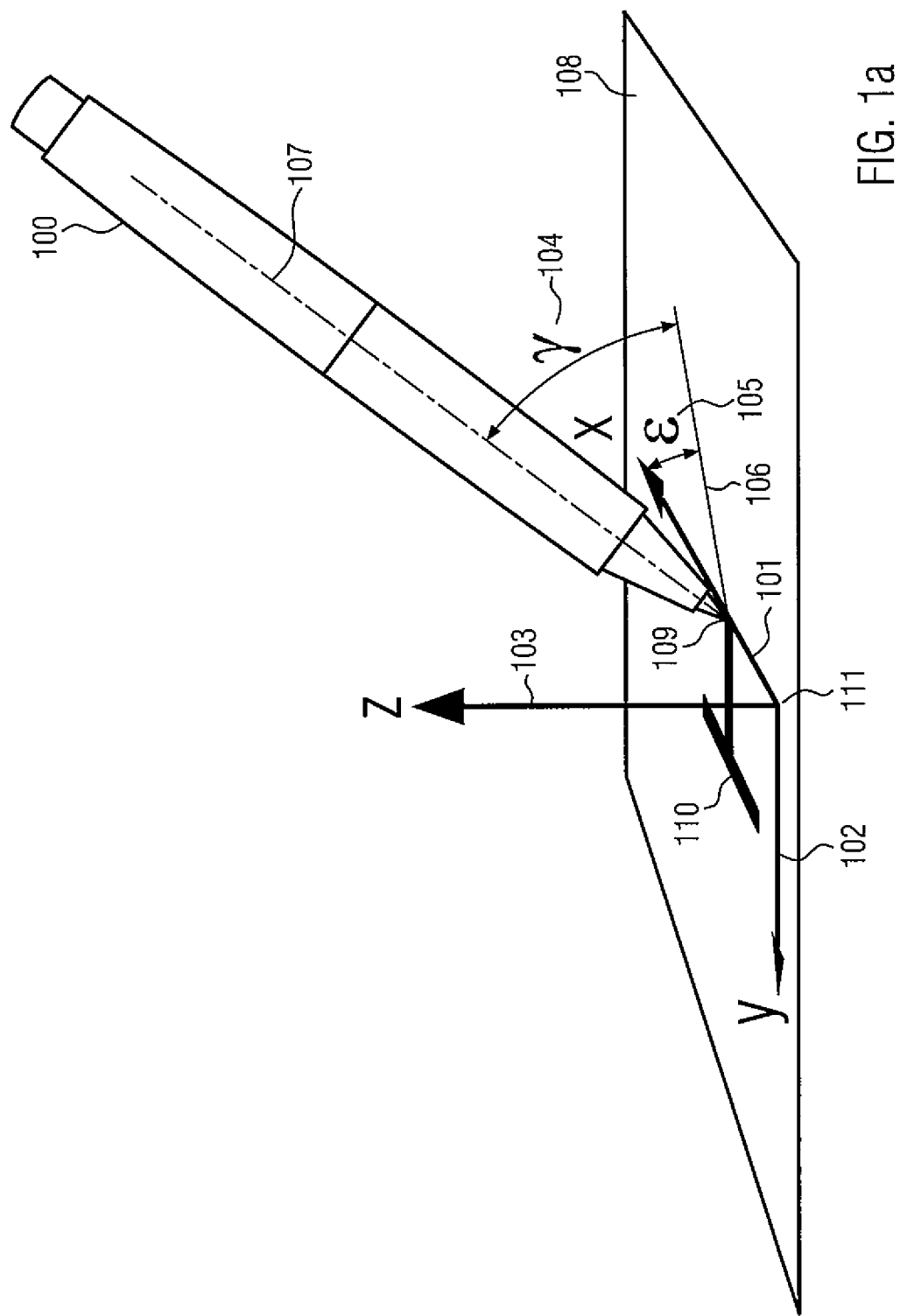

arising during said comparison between currently determined moving average values and initial average values and/or deviations between currently determined moving average values and previously determined moving average values from a pen position signal to be output.

14 Claims, 3 Drawing Sheets

(56) References Cited

U.S. PATENT DOCUMENTS

| | | |
|---|---|---|
| 2002/0148655 A1 | 10/2002 | Cho et al. |
| 2004/0140962 A1 | 7/2004 | Wang et al. |
| 2006/0279549 A1* | 12/2006 | Zhang ................ G06F 3/03545 345/173 |

FOREIGN PATENT DOCUMENTS

| | | |
|---|---|---|
| JP | 09190271 A | 7/1997 |
| KR | 1020110074145 A | 6/2011 |

* cited by examiner

ELECTRONIC PEN IMPLEMENTING SENSOR DRIFT COMPENSATION

CROSS-REFERENCE TO RELATED APPLICATIONS

This application is a national stage application of International Application No. PCT/EP2015/060785 titled "Electronic Pen Implementing Sensor Drift Compensation," filed on May 15, 2015 which claims the benefit of German Application No. 10 2014 106 839.4 filed on May 15, 2014, the entire contents of both of these applications are incorporated herein by reference.

PRIOR ART

The invention concerns a method to detect and evaluate movement patterns and pen positions of an electronic pen.

To detect movements of an electronic pen by means of inertial measurement systems, such as acceleration sensors or rotation rate sensors, the data of said sensors must be integrated once and/or twice to obtain a velocity signal (first integration) or a location signal (second integration) of the electronic pen. Minor errors in the measurements of acceleration processes and/or angular velocities by means of the inertial measurement sensors of the electronic pen can lead to major velocity determination errors during the first integration, which can in turn lead to even more severe errors in the location signal after the integration of the velocity signal.

Possible sources of error can thereby comprise, among others and besides inherent inaccuracies of numerical integration methods, inaccuracies of analogue-to-digital conversions of measurement sensor signals, zero point errors e.g. due to temperature drift, coincidental interferences or noise components inherent to the system.

As, for example, a new position of the electronic pen is determined on the basis of a predetermined position, errors with regard to velocity determination and positioning of the electronic pen can accumulate further and lead to a so-called undesired drift of the motion signal of the electronic pen.

Task

Hence, the purpose of the invention consists of improving an electronic pen, especially with regard to the level of accuracy in detecting movements of the electronic pen.

Solution

This is achieved, according to the invention, by a method to detect and evaluate movement patterns and pen positions of an electronic pen.

To detect the position of the tip and/or writing rod tip of an electronic pen, the pen can be equipped with an inertial measurement sensor technology and the movement can be reconstructed through the integration of the measurement data of said sensor technology.

A method according to the invention to detect and evaluate movement patterns and pen positions of an electronic pen with inertial measurement sensors during writing on a two-dimensional writing substrate can thereby comprise the following steps:

an initial specification of two axes X, Y, that are orthogonal to each other on the writing substrate, and an axis Z that is perpendicular to the two-dimensional writing substrate, whereby the X-axis can define a and/or the predominant writing direction, as well as a compensation of undesired drift in the pen position signal of the electronic pen to be output, comprising: a moving average process during a predefined time interval and with a predefined frequency of the pen movements and/or pen positions, determined by the inertial measurement sensors during writing based on integration of the sensor data, along both said axes X, Y that are orthogonal to each other, and further a periodic comparison of currently determined moving average values with initial average values and/or with previously defined moving average values, and subtraction of deviations emerging during said comparison between currently determined moving average values and initial average values and/or deviations between currently determined moving average values and previously determined moving average values, of a pen position signal to be output.

The axes X, Y located in the writing substrate plane and the axis Z that is perpendicular to the writing substrate plane can also define a reference coordinate system X, Y, Z for the electronic pen.

The currently determined average values of the pen position signal along both said axes X, Y that are orthogonal to each other can therefore be compared consecutively with previously determined average values of the pen position signal and/or expected initial average values that can be predetermined.

In this context, it shall be noted that the concept of a pen position signal can comprise both location signals as well as movement and/or acceleration signals of the electronic pen.

In other words, deviations of the recently identified writing movement, especially deviations of the identified writing movement direction, from a—based on previously identified or predetermined average values of the pen position signals—postulated movement and/or postulated writing movement directions can be advantageously interpreted this way as a drift and be subtracted from the determined pen position signal, i.e. for example a determined location value, prior to output of the pen position signal, i.e for example of the location signal, e.g. on a graphical display unit.

The sensor data of the measurement sensors can thereby be transformed onto the initially determined coordinate system X, Y of the writing substrate plane, preferably prior to integration, to determine the pen movements on the writing substrate.

Also, to increase the accuracy of the determination of the pen movements, the gravitational acceleration can, for example, be subtracted from the sensor data, especially from the acceleration sensor data, prior to the integration of the sensor data of the measurement sensors.

Therefore, the orientation of the measurement sensors to the direction of the gravitational force, determined for example by magnetic field and rotation rate sensors as well as sensor fusion processes, can preferably be taken into account.

The time interval of the moving average process over the pen movements determined from the sensor data through integration can, for example, be greater than 1 s, 2 s or 5 s.

The inertial measurement sensors and potential other sensors (such as writing force pressure sensor, magnetic field sensor, rotation rate sensor, etc.) can, for example, record measurement data at least every 50 ms during the use of the electronic pen in order to ensure that the sampling frequency is higher than the writing movement frequency or natural frequency (e.g. 3 Hz to 7 Hz) of the hand of the writing user, in order to be able to register all movements of the hand and/or of the electronic pen with sufficient accuracy.

In other words, the sampling frequency can be equal or higher than the minimum sampling frequency determined by the Nyquist-Shannon theorem.

Depending on the operating mode of the electronic pen, different initializations of the coordinate system used can occur to evaluate the pen positions. While it can be useful to know the absolute position of the electronic pen on the writing substrate (and/or the relative position in relation to reference points on the writing substrate, e.g. paper) for a drawing, a character recognition can, for example, be possible solely on the basis of the dynamic movement process of the electronic pen itself.

An initial specification of two axes, for example said X-axis and said Y-axis, that are orthogonal to each other on the writing substrate, can be specified as a function of the elevation angle or inclination angle $\gamma$ of the longitudinal axis of the electronic pen in relation to the writing substrate and/or as a function of an azimuthal angle c of the longitudinal axis of the electronic pen or of a projection of the longitudinal axis of the electronic pen.

For example, the azimuthal angle C can be defined for a typical writing posture as the angle between the X-axis of the coordinate system to be determined and the intersection line of a plane, which is formed by the longitudinal pen axis and a perpendicular line of the writing substrate, with the writing substrate plane.

Then, a second coordinate axis can be determined on the writing substrate based on a predetermined first coordinate axis on the writing substrate via the required orthogonal position, whereby a left-handed or right-handed coordinate system can optionally be determined.

At the start of the recording process of the pen position data, the azimuthal angle $\epsilon$ can be assumed to have a fixed value which can be derived, for example, from empirical data.

For example an angle of +30°±10° can, for example, be set as a preferred initial value of the azimuthal angle $\epsilon$.

If a predominant writing direction is defined as an X direction and the direction that is perpendicular to it in the sheet plane as a Y direction, an averaged constant movement in the X direction and small, temporary oscillations in the X and the Y direction can be assumed.

It can here be assumed that the velocities of the writing rod tip are here e.g. approx. 1.0±0.5 m/s and that they oscillate at the typical writing movement frequency between 3 and 7 Hz. The averaged or expected writing velocity in the X direction may thus lie at 1.0±0.5 m/s and the averaged writing velocity in the Y direction may lie at 0 m/s.

In case the said writing rod velocity is exceeded, a drift in the measurement sensors can be the cause.

A correction and/or compensation of a drift can be achieved, inter alia, by a plausibility check of the writing rod tip position. If, for example, the writing rod tip is positioned below the X-axis (i.e. below the writing direction), it can be assumed that the next movement will be upwards and that the position signal can be corrected for example with a ramp that forces this result.

The same applies for the signal of the X position: if it runs ahead or falls behind the expected value for too long, it can be corrected with a ramp as well.

As the writer's view is generally directed onto the writing substrate and not, for example, on the display unit during writing, a few seconds are usually available to correct the written text.

Therefore, it is possible, for example, to distort and/or correct the last written letters with (for example quadratically increasing) ramps (synonymous to zero point shifts of the integration results of the pen position signal) without being perceived by the writer.

In the further course, the azimuthal angle c can be further monitored, elaborated and adapted, for example by defining the main axis of the writing movements, that occur, for instance with a writing movement frequency of 3 to 7 Hz, with regard to a biometric inclination angle $\beta$ in relation to the axis of the writing direction (e.g. X-axis).

The said biometric inclination angle $\beta$ can, for example, be determined by the rotary axis of the second/middle joint of the index finger of the writing hand.

The index finger middle joint rotary axis is predetermined by the biomechanics of the writing hand and its alignment to the X-axis is a typical parameter that can be characterized by one's individual handwriting.

The biometric inclination angle $\beta$ can, inter alia, be adjusted by the user, e.g. in the default values of the signal-processing software of the electronic pen, in order to be able to set a desired inclination of the written characters in relation to the writing direction.

The velocity of the averaged constant movement in the writing direction can be used as a measure for the stretching or compression of the reproduced characters with regard to a reference velocity of the averaged constant writing movement.

To improve the velocity of the averaged constant movement in the writing direction, that was determined based on the sensor data of the electronic pen, the user can set an initial writing velocity value, for instance 0.1 to 2 cm/s, preferably 1±0.5 cm/s, that is typical for his handwriting.

Prior to the integration of the sensor data to determine the location signal of the electronic pen and the extraction of its movement in the writing direction, i.e. X direction, sensor data can be cleared up with a high-pass filter and a low-pass filter around the frequencies above and below the typical writing movement frequency of the user (3 to 7 Hz).

In other words, the sensor data can already be filtered and/or smoothed prior to an integration of the sensor data, and drift signals of the measurement sensors can already be corrected and compensated at least partially.

This smoothing and/or filtering process can reduce the noise in the sensor data and hence enable a better integration of the sensor data, as well as a reduction of a possible remaining drift signal after the integration.

The filtering of the sensor data can comprise proven processes of the moving average method. Besides the use of traditional filtering methods such as the Fast Fourier Transformation, a preferable numerical implementation can, for example, be ensured by wavelet filters, whereby good results can already be achieved with a simple basic pattern or basic wavelet such as the hair wavelet.

During a wavelet filtering process, a sequence of sensor data values is combined with a basic pattern, whereby the scale can be increased in several steps to apply the basic pattern.

The result are sequences of coefficients and of average values that can represent, depending on the desired filtering, a desired time-frequency representation of the sensor data values through an inversion of the combination with the basic pattern.

The coefficients of the components with a too high frequency, i.e. coefficients of frequency components above the writing movement frequency, and the average values of the components with a too low frequency, i.e. the average values of the frequency components below the writing movement frequency, can thereby be set to zero prior to said inversion.

If the wavelet transformations are applied per direction, the results can be for instance:
$n=2^m$ measurement points, $2^{m-1}$ 1st order coefficients, etc. up to a single coefficient of the m order, or, expressed in general terms, there will be $2^{m-i}$ coefficients of the order i and one coefficient of the order m.

When choosing n, it is advantageous to choose powers of 2. As a function of the data rate, the time interval, in which the filtering process can take place, can be controlled by choosing n.

For typical sensor data rates between 6 Hz to 100 Hz, typical values of n can range from 64 to 256, hence e.g. n=64 or 128 at a data rate of 60 Hz or n=128 or 256 at a data rate of 100 Hz.

If the said hair wavelet is used, there will be for instance the following coefficients and average values, whereby $S_i$=sensor data points and/or measurement values, $K_{k,i}$=coefficients of order k, $M_{k,i}$=average values of order k, k=order and/or level of the coefficients, i=counter of the coefficients of an order and/or sensor data point index, and whereby k and i are natural numbers greater than 0.

$$K_{1,i} = (S_{2i-1} - S_{2i})/\sqrt{2} \text{ and } M_{1,i} = (S_{2i-1} + S_{2i})/\sqrt{2} \text{ for } i = 1 \text{ to } n/2$$

$$K_{2,i} = (M_{1,2i-1} - M_{1,2i})/\sqrt{2} \text{ and } M_{2,i} = (M_{1,2i-1} + M_{1,2i})/\sqrt{2} \text{ for } i = 1 \text{ to } n/4$$

...

$$K_{k,i} = (M_{k-1,2i-1} - M_{k-1,2i})/\sqrt{2} \text{ and}$$

$$M_{k,i} = (M_{k-1,2i-1} + M_{k-1,2i} M_{ij} = (M_{i-1,2j-1} + M_{i-1,2j})/\sqrt{2}$$

$$\text{for } k > 1 \text{ and } i = 1, 2^{m-k}.$$

Consequently, first order coefficients are formed directly on the basis of the sensor data points and/or measurement values, while coefficients of a higher order are formed based on average values.

For the reconstruction of sensor data, for example, only the coefficients whose hair wavelet frequency is above the double writing movement frequency, and the average values whose hair wavelet frequency amounts to less than half of the writing movement frequency, are taken into account.

With $R_i$=reconstructed sensor data, $\log 2(n)$=logarithm of n to the base 2, the reconstructed sensor data can be expressed as follows.

$$R_{\log 2(n)-1,1} = (M_{\log 2(n),i} - K_{\log 2(n),i})/\sqrt{2} \text{ and}$$

$$R_{\log 2(n)-1,2} = (M_{\log 2(n),i} + K_{\log 2(n),i})/\sqrt{2}$$

...

$$R_{2i-1} = (R_{1,i} - K_{1,i})/\sqrt{2} \text{ and } R_{2i} = (R_{1,i} + K_{1,i})/\sqrt{2} \text{ for } i = 1 \text{ to } n.$$

Due to the condition that the remaining average value and, depending on a defined limit frequency, for frequency components below the writing movement frequency, e.g. a limit frequency lower than half of the writing movement frequency, also the coefficients of a higher order can be set to zero, an undesired drift of the movement signal of the electronic pen to be output, due to, for example, integration errors, can preferably be compensated and/or corrected.

In addition, the reset to zero of the coefficients of a lower order, e.g. for frequency components amounting to twice the writing movement frequency or higher, can entail a reduction of, inter alia, the noise of the sensor data signal.

It shall be mentioned for the sake of completeness that, if the writing movement occurs on a two-dimensional writing substrate area such as a sheet of paper, the drift of a perpendicular direction to the sheet plane can immediately be detected and easily compensated.

Information from a detected drift in a perpendicular direction to the sheet plane can, in addition, be used to correct errors concerning the determination of the local position of the electronic pen.

Further sampled values for the determination and compensation of an undesired drift in the pen position signal to be output with regard to the writing direction are possible by using a writing pressure signal, for example from a writing pressure force sensor coupled to the writing rod.

A short (for example shorter than 0.3 s) pressure pulse is usually the consequence of a point (full stop or dot on the i) where the tip of the pen rests for a moment, i.e. where the tip of the pen is not moving in the writing substrate plane.

At this resting point of the writing rod tip of the electronic pen with regard to the writing substrate plane, i.e. as a consequence of said punctuation, the drift in the X and the Y direction can be locally read from the integrated velocity signal and the pen position signal to be output can be corrected this way.

Moreover, a character inclination/handwriting inclination correction of the determined pen position signal can be carried out, i.e. errors in the determined character inclination and/or an undesired drift of the character inclination signal can also be corrected and compensated by means of comparing the determined character inclination with a postulated character inclination. Possible deviations resulting from said comparison can be corrected prior to the emission of the pen position signal, i.e. the location signal, through an appropriate transformation of the determined pen position signal, i.e. the determined location value.

The postulated or desired character inclination can thereby be preset, for example, by the user, for instance as a setting for a digital control unit of the electronic pen or as a parameter for a data evaluation unit. The postulated or desired character inclination can thereby be perceived as the characteristic handwriting inclination of the handwriting of a user.

The said postulated or desired character inclination can thereby result from an analysis based on a preferred direction of the frequency distribution of the direction of the writing movements of the electronic pen with the intrinsic writing frequency (3 Hz to 7 Hz) of the writing hand and be characterized, for example, by the angle $\eta$ of the preferred writing direction such as the angle between the character axis and the writing direction axis, e.g. the X-axis.

The angle between this ascertained preferential direction and the desired inclination of the handwriting can then be used as a basis for compensating the inclination of the handwriting. To this end, e.g. a rectangle can first be specified, which comprises the handwriting of a written line along the writing direction and which can then be sheared with the desired handwriting inclination compensation angle.

In addition, the inclination of the electronic pen in the space, i.e. the inclination angle $\gamma$ introduced above, can be measured through the low-pass filtered acceleration sensor, and short-term variations of $\gamma$ can be tracked by magnetic field sensors and rotation rate sensors.

If, for example, the thus obtained inclination angle $\gamma$ is correct, e.g. the value of the acceleration of gravity is obtained as a predetermined, expected value of the acceleration in the Z direction, in addition to the accelerations of the electronic pen in the coordinates of the writing substrate coordinate axes X, Y, after the coordinate transformation of the accelerations, measured e.g. by the inertial measurement sensors, into the writing substrate coordinates x, y, described by the orthogonal writing substrate coordinate axes X, Y.

If, for example, the thus ascertained value of the Z acceleration should deviate from the value of the acceleration of gravity, although e.g. the tip of the pen is in contact with the sheet or writing substrate, as can easily be detected e.g. via a writing pressure sensor, there will be an error in the ascertained inclination angle γ in all likelihood. Such an error may be caused e.g. by an undesirable sensor drift in the measurement sensors of the electronic pen, but it may e.g. also be caused by anomalies of the magnetic field surrounding the pen and the writing substrate, respectively.

If, for example, the acceleration of gravity has been subtracted from the measured acceleration sensor data prior to the integration of said acceleration sensor data, the acceleration in Z, i.e. the Z signal in the writing substrate coordinate system, or if e.g. a writing pressure sensor signalizes that there is contact with the writing substrate, will ideally be equal to zero.

If this is not the case, this may be due to the fact that the writing substrate is not positioned horizontally, and a small value correlated with the X and Y signals may remain, from which the inclination of the writing substrate (or the error in the calculation of the acceleration of gravity) can be ascertained.

Deviations from a Z value to be expected, i.e. the value of the accelerations in Z, can therefore be indications for errors concerning the calculation of the position of the pen and be corrected, for example, by setting the Z value and/or the acceleration value in Z to zero when the pen comes in contact with the writing substrate.

In addition, a correction of the determined accelerations in Z can be achieved as follows.

For example, by means of conducting the coordinate transformation for several values of the inclination angle γ and the azimuth angle ε of the pen in parallel, the linear combination of inclination and azimuth angles γ, ε, for which the error of the determined Z acceleration, i.e. deviations from a Z value of the acceleration to be expected, e.g. a Z value of the acceleration to be expected equal to zero or equal to the gravitational acceleration, becomes minimal, can be determined in a subsequent calculation step.

A linear combination of values of azimuth angle ε and inclination angle γ can thereby be understood as a pair of values, each comprising a value of the azimuth angle ε as well as a value of the inclination angle γ.

An inclination information and/or an inclination angle γ corrected this way can preferably also reduce errors in the X- and Y-axes of the acceleration signal.

With this correction, it is further possible to map the magnetic anomalies above the writing substrate coordinates and to enable absolute referencing by means of these anomalies.

This absolute referencing can be realized e.g. by intentionally distorting the local magnetic field (e.g. through a permanent magnet located in the vicinity thereof). To this end, a permanent magnet may be accommodated e.g. in the cap of the pen and be deposited, during writing, in the vicinity of the writing substrate at a well-defined location, e.g. on the margin of the writing substrate, e.g. on the margin of a writing substrate in A4 format. The minimum distance between the permanent magnet and the electronic pen which may here preferably be observed is a distance of e.g. more than 1, 2 or 3 cm, so as to prevent excessive loads on the magnetic field sensor.

The strength of the magnetic field or the change in said strength will then allow conclusions to be drawn on the distance to the magnet, and the direction of the magnetic field allows conclusions to be drawn on the position of the electronic pen, which can then advantageously be expressed in polar coordinates.

In other words, the determination of the inclination angle γ in combination with the measurement of the strength or of the change of the natural magnetic field or of an artificial magnetic field allows absolute referencing of the position signal, i.e. of the location, of the electronic pen on the writing substrate.

An electronic pen with a writing position detection system according to the invention can therefore comprise a writing rod, at least an electric voltage source, at least a digital control unit, at least a data transmission module, as well as inertial measurement sensors, and be characterized in that the digital control unit can be configured for the initial specification of two axes, X, Y, that are orthogonal to each other on the writing substrate, and an axis Z that is perpendicular to the two-dimensional writing substrate, whereby the X-axis defines the initial writing direction and can be further configured for compensation of an undesired drift in the writing position signal of the electronic pen to be output.

In this context, the digital control unit can also be configured for a moving average process during a predefined time interval and with a predefined frequency of the pen movements, determined by the inertial measurement sensors during writing through integration of the sensor data of the measurement sensors on the writing substrate along both of said axes X, Y, that are orthogonal to each other, as well as for a periodic comparison of currently determined moving average values with initial average values and/or with previously determined moving average values, and also be configured for the subtraction of deviations arising during said comparison between currently determined moving average values and initial average values and/or deviations between currently determined moving average values and previously determined moving average values of a pen position signal to be output.

A system for electronic detection of pen positions according to the invention can, inter alia, be used to monitor the calculations and corrections made by the electronic pen to determine pen positions and to monitor and to repeat drift corrections and, if necessary, to complement and/or to correct as well as and above all to enable the output of the processed data of the electronic pen on a data output unit and/or to save this data on a data memory unit.

A system for electronic detection of pen positions according to the invention can also comprise an electronic pen as described above, which can be configured to implement a method as described above and that has at least one data reception module to receive data emitted by the data transmission module of the electronic pen, a data evaluation unit to evaluate and process the received data, a data output unit and a data memory unit, and which can be characterized in that the data evaluation unit can implement an integration and an error correction of the received data and output the processed data on the data output unit and/or save this data on a data memory unit.

The following figures display in an exemplary way:

FIG. 1a: a schematic three-dimensional view of an exemplary writing-substrate coordinate system of an electronic pen.

Figure 1B:
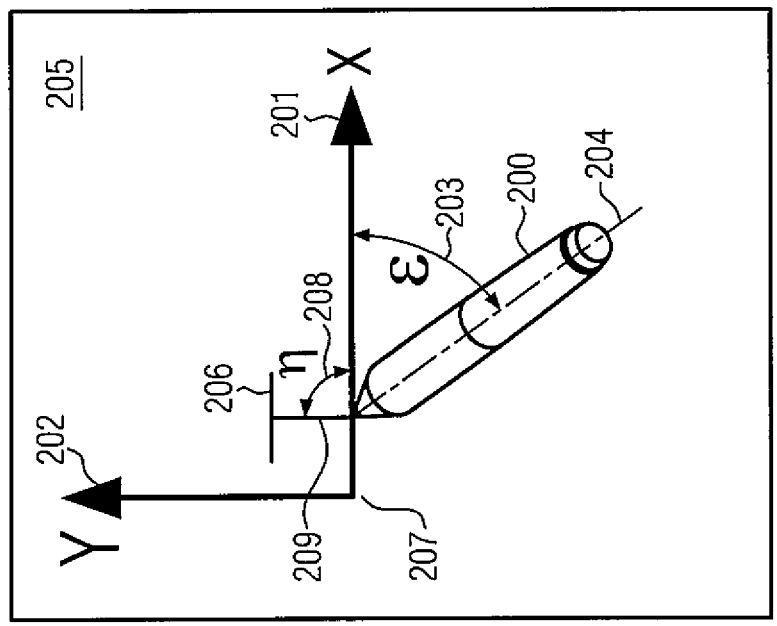

FIG. 1b: a schematic top view of an exemplary writing-substrate coordinate system of an electronic pen.

Figure 2:
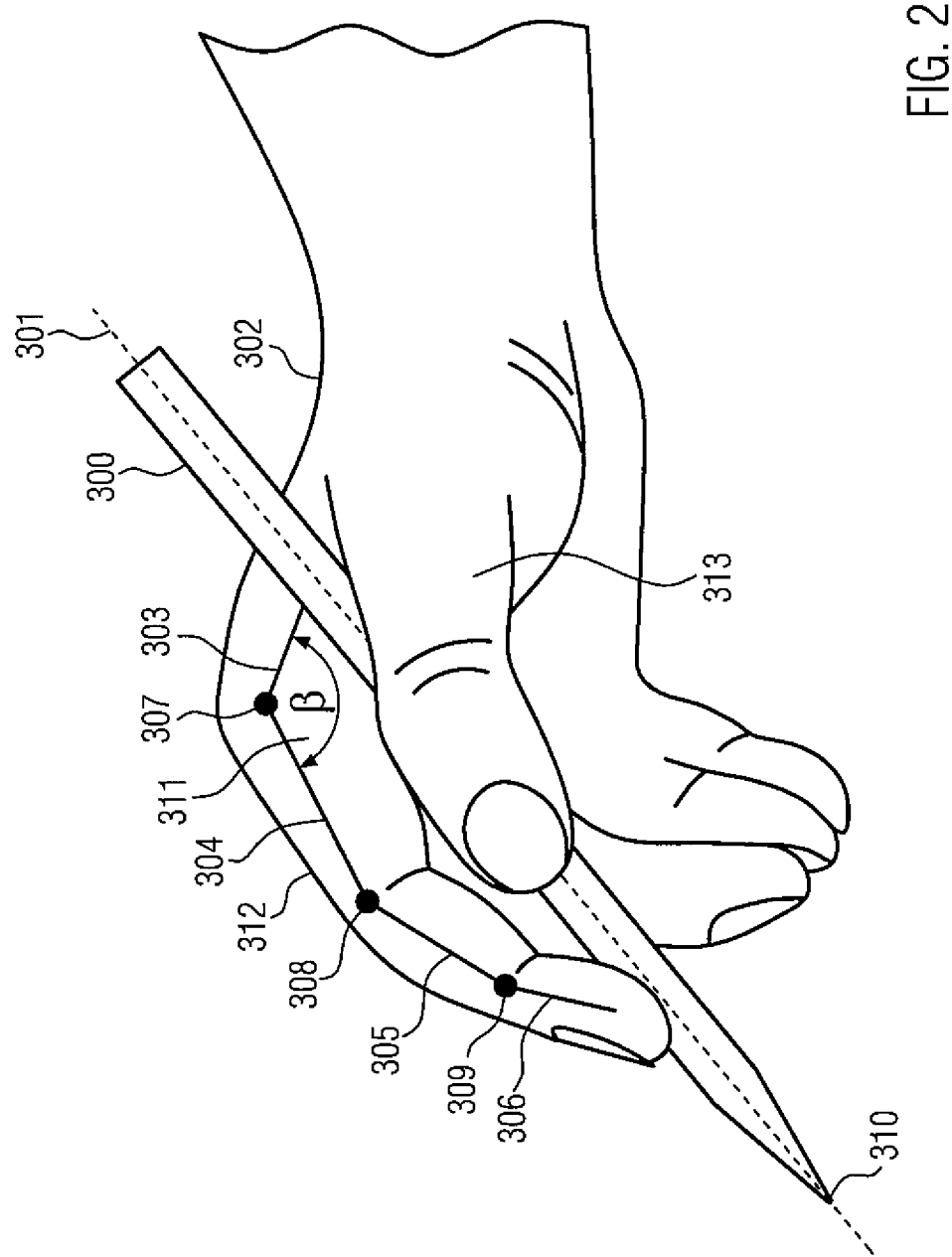

FIG. 2: a schematic example of specifying a biometric inclination angle β.

FIG. 1a exemplarily shows a three-dimensional view of an exemplary writing-substrate coordinate system 111 of an electronic pen 100, which is capable of writing characters 110 on a two-dimensional writing substrate 108.

The axes X (101), Y (102), which extend in the writing substrate plane and which can be specified as described above, are orthogonal to each other and the axis Z (103) is perpendicular to the writing substrate 108.

The elevation angle or inclination angle γ (104) of the electronic pen 100 may e.g. be defined as the angle between the longitudinal axis 107 of the electronic pen 100 and the writing substrate 108, i.e. the two-dimensional writing substrate plane.

The azimuthal angle ε (105) of the electronic pen 100 can be defined as an angle between the longitudinal axis 107 of the electronic pen 100 and the X axis 101 or as an angle between a projection 106 of the longitudinal axis 107 of the electronic pen 100 onto the writing substrate 108 and the X axis 101.

As has already been mentioned, the axes X (101), Y (102), which are orthogonal to each other on the writing substrate 108, may initially be specified as a function of the elevation angle or inclination angle γ (104) of the longitudinal axis 107 of the electronic pen 100 with respect to the writing substrate 108.

For example, in the case of a typical writing posture, the azimuthal angle ε (105) can be defined as the angle between the X axis 101 of the coordinate system 111 to be used/to be specified and the projection 106 of the longitudinal axis 107 of the pen onto the writing substrate 108, i.e. the line of intersection along which a plane, defined by the longitudinal axis 107 of the pen and a writing substrate perpendicular, intersects the writing substrate plane.

On the basis of a first coordinate axis, e.g. the X axis 101, on the writing substrate 108, which is specified e.g. according to the specification of the azimuthal angle ε (105), it is then possible to specify a second coordinate axis, e.g. the Y axis 102, on the writing substrate 108 via the demanded orthogonality, the coordinate system being here selectively specifiable as a left- or right-handed coordinate system. Also a third axis, the Z axis 103, which is perpendicular to the writing substrate 108, can be derived from the specified axes X (101), Y (102) through a demanded orthogonality with respect to said axes X (101), Y (102).

The coordinate system X, Y, Z (111) shown in FIG. 1a is e.g. a right-handed coordinate system.

It is also imaginable to use for inclination angles γ (104) of the pen longitudinal axis 107 which are different from 90° the projection 106 of the pen longitudinal axis 107 onto the writing substrate 108 for defining a first coordinate axis, e.g. the Y axis 102.

The writing direction of the electronic pen 100 may be defined, e.g. by the X axis 101.

In addition, FIG. 1a shows exemplarily a character 110, e.g. a "T", written with the writing rod tip 109 of the electronic pen 100 on the writing substrate 108.

FIG. 1b shows exemplarily the schematic top view of a writing-substrate coordinate system 207 of an electronic pen 200, which is analogous to or identical with the writing-substrate coordinate system of FIG. 1a.

The azimuthal angle ε (203) of the electronic pen 200 is here defined e.g. as angle between the longitudinal axis 204 of the electronic pen 200 and the X axis 201. In other words, it is e.g. a selection of the azimuthal angle ε (203) that specifies the X axis 201 and, as described above, a first coordinate axis specified on the writing substrate 205 can then be used for specifying on the basis thereof, through an orthogonality demand, the second coordinate axis on the writing substrate 205, e.g. the Y axis 202, as well as the third coordinate axis, e.g. the Z axis (not shown), which is perpendicular to the writing substrate 205.

In addition, just as FIG. 1a, also FIG. 1b exemplarily shows a character 110 written with the electronic pen 100 on the writing substrate 108, viz. an exemplary "T", which may comprise a first character axis or major axis 209, e.g. a longitudinal line, and a second character axis or minor axis 206, e.g. a horizontal line.

Here, e.g. a direction angle η (208) of a preferential direction of writing may be defined as an angle between a character axis 209 and the axis of the direction of writing, e.g. the X axis 201.

FIG. 2 exemplarily shows a three-dimensional view of the writing hand 302 of a user of an electronic pen 300.

The electronic pen 300 with the writing rod tip 310 is here exemplarily located between the index finger 312 and the thumb 313 of the user.

In addition, the figure shows exemplarily the first 303, second 304, third 305 and fourth 306 articular bones of the index finger 312, including its first (metacarpophalangeal joint) 307, second (proximal interphalangeal joint) 308 and third (distal interphalangeal joint) 309 joint.

The value of an azimuthal angle ε of the above-defined type can be specified e.g. through a biometric inclination angle β (311) defined between a first articular bone 303 of the writing hand index finger 302 and a second articular bone 304 of the writing hand index finger 302, and additionally characterized by the spatial orientation of the axis of rotation (not shown) of the proximal interphalangeal joint 308 of the index finger 312 of the writing hand 302 of the user during writing.

The axis of rotation of the proximal interphalangeal joint of the index finger is given through the biomechanics of the writing hand, and its orientation relative to the X axis (not shown) is a typical parameter by means of which the individual handwriting can be characterized.

The biometric inclination angle β (311) can be set, for example by the user, e.g. in default settings of the signal-processing software of the electronic pen 300.

For the sake of completeness, it should be mentioned that the features, definitions and/or magnitudes which are exemplarily described in the figures can be combined in accordance with the present invention.

Followed by 3 sheets with 3 figures. The reference numerals identify the following components:
100 electronic pen
101 first coordinate axis, e.g. X axis
102 second coordinate axis, e.g. Y axis
103 third coordinate axis, e.g. Z axis
104 elevation angle or inclination angle γ of the longitudinal axis of the electronic pen with respect to the writing substrate
105 azimuthal angle ε
106 projection of the longitudinal axis 107 of the electronic pen 100 onto the writing substrate 108 or line of intersection along which a plane, defined by the longitudinal axis 107 of the pen and a writing substrate perpendicular, intersects the writing substrate plane.
107 longitudinal axis of the electronic pen
108 writing substrate/writing substrate plane
109 writing rod tip 110 character written with the electronic pen
111 coordinate system X, Y, Z, reference coordinate system
200 electronic pen
201 first coordinate axis, e.g. X axis
202 second coordinate axis, e.g. Y axis
203 azimuthal angle ε
204 longitudinal axis of the electronic pen
205 writing substrate/writing substrate plane
206 second character axis or minor axis
207 coordinate system X, Y, Z, reference coordinate system
208 direction angle η of a preferential direction of writing
209 first character axis or major axis
300 electronic pen
301 longitudinal axis of the electronic pen
302 writing hand of a user of an electronic pen 300
303 first articular bone of the index finger of the writing hand
304 second articular bone of the index finger of the writing hand
305 third articular bone of the index finger of the writing hand
306 fourth articular bone of the index finger of the writing hand
307 first joint (metacarpophalangeal joint) of the index finger of the writing hand
308 second joint (proximal interphalangeal joint) of the index finger of the writing hand
309 third joint (distal interphalangeal joint) of the index finger of the writing hand
310 writing rod tip
311 biometric inclination angle β
312 index finger of the writing hand of a user
313 thumb of the writing hand of a user

The invention claimed is:

1. A method to detect and evaluate movement patterns and pen positions of an electronic pen (100, 200, 300) with inertial measurement sensors during writing on a two-dimensional writing substrate (108, 205), the method comprising:
  initially specifying two axes X, Y (101, 102, 201, 202), that are orthogonal to each other on the writing substrate, and an axis Z (103) that is perpendicular to the two-dimensional writing substrate (108, 205), whereby the X-axis (101, 201) defines the predominant writing direction;
  compensation of undesired drift in a pen position signal to be output, the compensation comprising:
    moving average process over a predefined time interval and a predefined frequency of the pen movements on the writing substrate (108, 205), determined by the inertial measurement sensors during writing through integration of the sensor data of the measurement sensors, along both axes X, Y (101, 102, 201, 202) that are orthogonal to each other;
    periodically comparing currently determined moving average values with initial average values or with previously determined moving average values;
    subtracting deviations arising during said comparison between the currently determined moving average values and initial average values or deviations between currently determined moving average values and previously determined moving average values, from the pen position signal to be output;
    clearing up the sensor data with a high-pass filter and a low-pass filter around the frequencies above and below a writing movement frequency of the user prior to integration of the sensor data for the determination of a location signal of the electronic pen (100, 200, 300) and extraction of its movement in the writing direction.

2. A method according to claim 1, whereby the time interval of the moving average is greater than 1 s, 2 s or 5 s.

3. A method according to claim 1, whereby an initial specification of the two axes X, Y (101, 102, 201, 202), that are orthogonal to each other on the writing substrate (108, 205), occurs as a function of the elevation angle or inclination angle γ (104) of the longitudinal axis of the electronic pen (100, 200, 300) in relation to the writing substrate (108, 205) or as a function of a azimuthal angle s (105, 203) of the longitudinal axis (107, 204, 301) of the electronic pen (100, 200, 300) or a projection (106) of the longitudinal axis of the electronic pen.

4. A method according to claim 3, whereby the azimuthal angles (105, 203) is defined as the angle between the X-axis of the coordinate system to be determined (111, 207) and the intersection line (106) of a plane, which is formed by the longitudinal pen axis and a writing substrate perpendicular with a writing substrate plane.

5. A method according to claim 3, whereby a value of +30°±10° is set as an initial value of the azimuthal angle s (105, 203).

6. A method according to claim 3, whereby the azimuthal angle s (105, 203) is adapted as a function of a biometric inclination angle β (311) in relation to the writing direction axis and which is determined by the rotary axis of the second joint (308) of the forefinger of the writing hand.

7. A method according to claim 1, whereby the user sets an initial writing velocity value, for example between 0.1 to 2 cm/s, preferably 1±0.5 cm/s, that is typical for his handwriting.

8. A method according to claim 1, whereby the step of clearing up the sensor data is ensured by a wavelet filter and whereby a Haar wavelet is applied as a basic wavelet.

9. A method according to claim 1, whereby at a resting point of a writing rod tip of the electronic pen in relation to the writing substrate plane, the drift in the X and the Y direction is read locally from an integrated velocity signal whereby the pen position signal to be output is corrected.

10. A method according to claim 1 whereby errors in a determined character inclination are corrected and compensated by a comparison of the determined character inclination with a postulated character inclination.

11. A method according to claim 1 whereby a coordinate transformation of the azimuth angle ε (105, 203) and the inclination angle γ (104) to writing substrate coordinates x, y is done in parallel for a plurality of values for azimuth angles ε (105, 203) and inclination angles γ (104), and whereby the linear combination of azimuth angle ε (105, 203) and inclination angle γ (104), at which an error in the determined acceleration in the Z direction is reduced to a minimum, is determined.

12. A method according to claim 1, whereby an absolute referencing of the position of the electronic pen (100, 200, 300) on the writing substrate (108, 205) is implemented through determination of the inclination angle γ (104) together with the measurement of the strength or the change of the natural magnetic field or a local artificial magnetic field.

13. An electronic pen (100, 200, 300) with a pen position detection system, the pen detection system comprising a writing rod, at least an electric voltage source, at least a digital control unit, at least a data transmission module, and a plurality of inertial measurement sensors, characterized in that the digital control unit is configured for an initial specification of two axes X, Y (101, 102, 201, 202), that are orthogonal to each other on the writing substrate (108, 205), and an axis Z that is perpendicular to the two-dimensional writing substrate, whereby the X-axis (101, 201) defines the initial writing direction, and in addition configured for compensation of undesired drift in a writing position signal of the electronic pen (100, 200, 300) to be output, including a configuration of the digital control unit:

for a moving average process over a predefined time interval and a predefined frequency of the pen movements on the writing substrate (108, 205), determined by inertial measurement sensors during writing through integration of sensor data of the measurement sensors, along the two axes X, Y (101, 102, 201, 202), that are orthogonal to each other, as well as for a periodic comparison of currently determined moving average values with initial average values or previously determined moving average values, and further configured for subtraction of deviations, arising during said comparison between currently determined moving average values and initial average values or deviations between currently determined moving average values and previously determined moving average values, from a pen position signal to be output, and a configuration such that the sensor data are cleared up with a high-pass filter and a low-pass filter around the frequencies above and below the writing movement frequency of the user prior to the integration of the sensor data for the determination of a location signal of the electronic pen (100, 200, 300) and the extraction of its movement in the writing direction.

14. A system to electronically detect pen positions, comprising:

an electronic pen (100, 200, 300) according to claim 13 and configured to detect and evaluate movement patterns and pen positions of an electronic pen (100, 200, 300) with inertial measurement sensors during writing on a two-dimensional writing substrate (108, 205), the method comprising:

initially specifying two axes X, Y (101, 102, 201, 202), that are orthogonal to each other on the writing substrate, and an axis Z (103) that is perpendicular to the two-dimensional writing substrate (108, 205), whereby the X-axis (101, 201) defines the predominant writing direction;

compensating undesired drift in the pen position signal to be output, said compensating comprising:

moving average process over a predefined time interval and a predefined frequency of the pen movements on the writing substrate (108, 205), determined by the inertial measurement sensors during writing through integration of the sensor data of the measurement sensors, along both axes X, Y (101, 102, 201, 202) that are orthogonal to each other;

periodiccally comparing currently determined moving average values with initial average values or with previously determined moving average values;

subtracting deviations arising during said comparison between the currently determined moving average values and initial average values or deviations between currently determined moving average values and previously determined moving average values, from a pen position signal to be output;

at least one data receiver module to receive data sent by the data transmission module (111) of the electronic pen (100, 200, 300), a data evaluation unit to assess and process the received data, a data output unit and a data memory system, characterized in that the data evaluation unit can implement an integration and error correction of the received data, and output the processed data on the data output unit or save them on a data memory system.

* * * * *